UNITED STATES PATENT OFFICE.

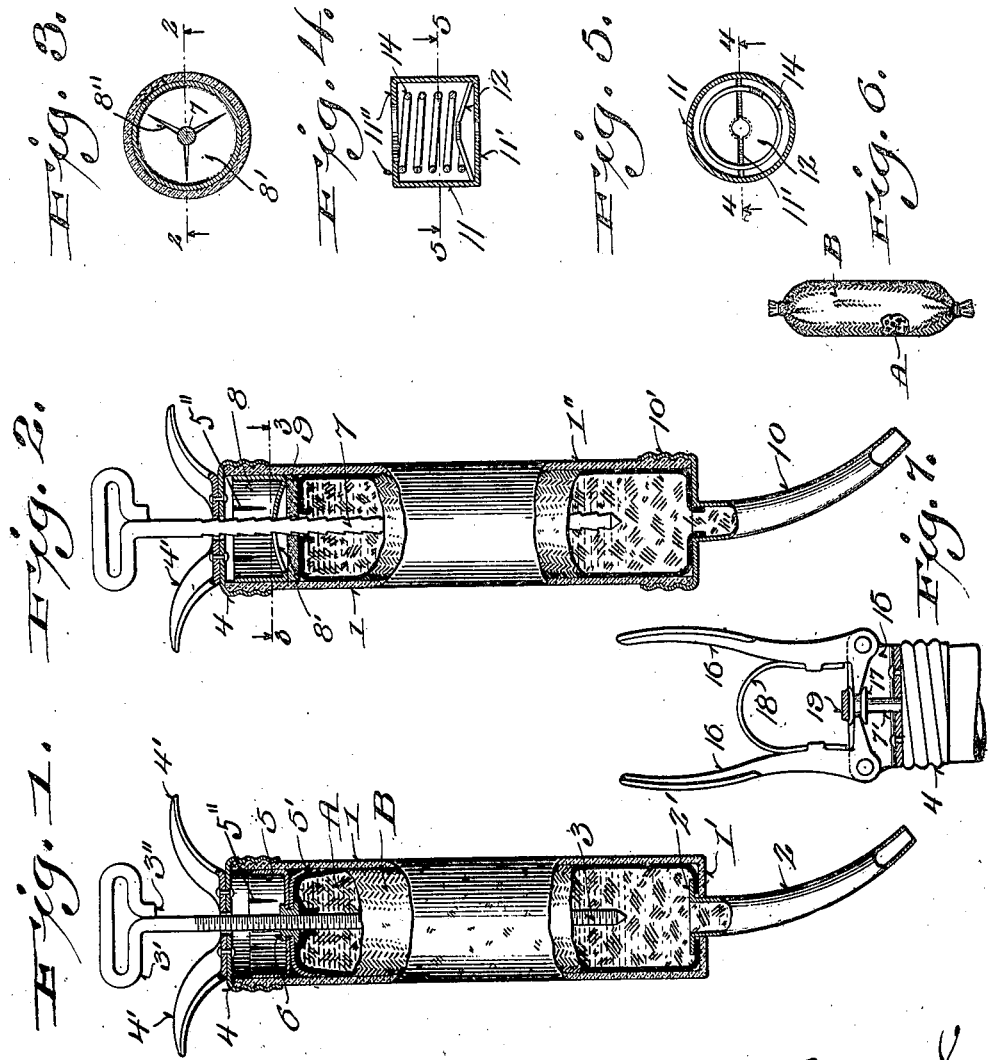

GEORGE E. WEBB, OF MILWAUKEE, WISCONSIN.

GREASE-GUN.

1,117,730.  Specification of Letters Patent.  Patented Nov. 17, 1914.

Application filed July 5, 1913. Serial No. 777,584.

*To all whom it may concern:*

Be it known that I, GEORGE E. WEBB, a citizen of the United States, and resident of Milwaukee, in the county of Milwaukee and State of Wisconsin, have invented certain new and useful Improvements in Grease-Guns; and I do hereby declare that the following is a full, clear, and exact description thereof.

My invention has for its object to provide a simple, economical and effective grease gun especially designed for heavy oils or grease, the construction and arrangement being such that a grease cartridge, in the form of an original package, can conveniently be inserted into the receptacle and a predetermined quantity of the grease can readily be discharged, through the manipulation of a piston-rod having a piston-head in clutch connection therewith. Hence it is apparent that a great saving in grease may be effected, due to the fact that a predetermined quantity can be discharged by gaging the piston-rod for discharging the required amount of grease, while at the same time the container protects the operator against the usual uncleanly conditions resulting from the ordinary method of oiling and when not in use said container can be conveniently stored without liability of wasting its contents upon juxtaposed articles.

This container is particularly designed for use in oiling automobile parts and is adapted to receive a fresh supply of grease by means of inserting the cartridge in the form of an original package.

It is also obvious, that while I have particularly designed the article for oiling the parts of automobiles, that its use may be extended to fill the requirements in discharging various pasty substances.

With the above objects in view the invention consists in certain peculiarities of construction and combination of parts as hereinafter set forth with reference to the accompanying drawing and subsequently claimed.

In the drawings Figure 1 represents a side elevation partly broken away and in section of a container embodying the features of my invention, the container being shown with a grease cartridge positioned therein; Fig. 2 represents a similar view of another form of grease cartridge embodying the features of my invention; Fig. 3, a detailed cross-section of the same, the section being indicated by line 3—3 of Fig. 2, the said view illustrating a form of clutch connection between a piston and a piston-rod, which elements constitute features of my invention; Fig. 4, a detailed sectional elevation of another form of clutch mechanism, the section being indicated by line 4—4 of Fig. 5; Fig. 5, a sectional plan view of the same, the section being indicated by line 5—5 of Fig. 4; Fig. 6, a detailed view of an original package containing the grease utilized in loading the container, and Fig. 7, a detailed elevation with parts in section of another form of feed-actuating mechanism.

Referring by characters to the drawings, 1 represents a cylinder, which cylinder for economy in manufacture, is preferably composed of a standard fiber tubing. The upper end of the cylinder 1 is formed with an open mouth and the lower end is provided with a normally closed bottom 1' as shown in the exemplification of my invention in Fig. 1 of the drawings, which bottom in this instance is apertured for the reception of a discharge nozzle 2 that protrudes through the aperture.

As best shown in Fig. 6, a body of grease A, incased in a textile jacket B, is provided, which jacket is normally closed at its end in any suitable manner, the same, in conjunction with the grease, constituting a cartridge. It is understood that these cartridges form original packages which are supplied in quantities, each being adapted to be fitted into the container to supplement a depleted cartridge. Prior to being inserted into the container, the cartridge jacket is opened at one end and the flanged shank 2' of the nozzle 2 is inserted therein. Thereafter the cartridge, together with the nozzle, is inserted into the cylinder through its mouth in the position shown by Fig. 1 of the drawings.

A grease ejector mechanism is next fitted to the container, which mechanism comprises, in this instance, a threaded rod or stem 3 having one end bent to form a handle 3', the terminal of which handle constitutes a stop-lug 3'' that is adapted to engage a cap 4, whereby movement of the piston-rod is limited in one direction. The piston-rod 3 is fitted through an aperture in the cap and said cap is threaded for engagement with the threaded exterior of the cylinder adjacent to its mouth, whereby said cap forms a cover therefor. The cap carrier gripping wings 4', which gripping wings in conjunction with the piston-rod handle form means whereby the rod is manually forced downward to effect a grease-feeding operation. The stem or rod 3 also carries a piston-head, which piston-head is composed of oppositely extending cup-like shells 5, 5'. The inner shell 5' is, as shown, concavo-convexed in cross-section and the outer shell 5 is provided with a flat bottom that is merged into cylindrical walls, which walls are provided with longitudinal splits 5" to form spring sections, whereby a frictional engagement is effected between this shell member and the inner walls of the cylinder 1. The two shell members 5, 5' are secured together by a ferrule 6, which ferrule is internally threaded for engagement with the piston-rod 3, the said threaded connection between the rod and piston-head constituting a clutching engagement.

The above described assemblage of grease-feeding mechanism is inserted into the cylinder in such manner that the rod is caused to pierce the upper closed end of the grease-cartridge casing and thereafter said rod is forced through the grease to a point adjacent to the lower end of the cartridge, in which position the concavo-convexed shell 5' will be nested snugly against the upper end of said cartridge. The cap 4 is then screwed about the mouth of the cylinder and the device is prepared for use, it being understood that the end of the rod, in its initial position, will be juxtaposed to the throat of the discharge nozzle 2.

To discharge a predetermined volume of grease for lubricating a specific machine element the operator will first revolve the piston-rod in a direction to cause said piston-rod, through its engagement with the thimble 6, to move back from the face of the cap 4 as indicated in full lines in Fig. 1. The distance between the stop-lug 3' and the face of the cap will visibly gage the selected amount of grease to be discharged and hence, in effecting a discharge of the grease after the piston has been withdrawn to the position shown, the operator grasps the wings 4', utilizing them as a purchase and thereafter forces the piston downwardly to cause its stop-lug to engage the face of the cap 4. This downward movement of the piston-rod causes the piston-head to travel a like distance downwardly, whereby grease is discharged from the open end of the cartridge through the nozzle 2. The upper end of the jacket B, which is fitted about the inner face of the cup-like shell 5', is thus rolled inwardly and compressed within said shell, whereby the slack in the jacket is taken up. In repeating the operation the stem is again rotated, whereby it is caused to travel outwardly a predetermined distance, depending upon the volume of grease to be discharged and in traveling outwardly it is understood that the piston, through its frictional engagement with the cylinder, will remain at rest in the position which it had assumed in the prior downward discharge movement of the piston-rod and hence, after a repeated number of feed movements of the piston-rod, the grease being depleted from the jacket, said jacket will be folded in a tight wad within the shell 5' and practically the entire amount of grease has been discharged. The head then assumes a position adjacent to the bottom of the cylinder, being in threaded or clutched engagement with the end of the piston-rod.

It is apparent from the foregoing description that, by removing the cap 4, the empty jacket B, together with the nozzle and piston-head, can all readily be removed from the cylinder preparatory to inserting a loaded cartridge therein.

Referring to Fig. 2 of the drawings another form of my invention is illustrated, wherein the piston-rod 7 is notched throughout its length and in this instance the piston-head 8 is formed with a concavo-convexed bottom 8', which bottom is provided with a series of radial splits 8" that intersect a central aperture through which the rod extends. The divided sections of the bottom 8' thus form spring clutch members, which members permit the spindle to be retracted preparatory to a grease-feeding movement similar to that previously described with relation to the construction shown in Fig. 1 of the drawings. When the piston-rod 7 is forced downwardly to effect a feed movement it is apparent that its clutching engagement with the piston-head 8 will cause said head to travel with the rod and thus feed a predetermined quantity of grease in the same manner as that mentioned heretofore.

To prevent the grease from escaping backward through the bottom of the piston-head when said grease is put under pressure, I provide a packing-ring or gasket 9, which gasket is snugly fitted about the piston-rod and arranged to abut the outer bottom edge of the piston-head, it being understood that the gasket may be formed from any suitable material and that the piston-head 8, in this instance, is split longitudinally at certain distances about its cylindrical wall to present the proper amount of frictional contact with relation to the inner walls of the cylinder, whereby said piston-head will be held against backward movement when the piston-rod is retracted. It is also apparent that, owing to the concavo-convexed form of bottom utilized in connection with the piston-head, that the separated spring members will permit ready yield when the rod is drawn outwardly and that said rod will be instantly clutched upon a downward movement to effect a feeding operation.

Fig. 2 shows a discharge nozzle 10 which nozzle is flared at its shank and terminates with a threaded ferrule 10' for engagement with the corresponding threaded end of the cylinder 1", which cylinder in this case is open at both ends as shown and at its upper end is closed by a cap 4 similar to the cap previously described. By employing a nozzle 10 with a threaded shank, as shown, it is apparent that said nozzle may remain intact with the cylinder when a loading operation takes place, it only being necessary in this case to open the lower end of the cartridge jacket, whereby the contents will be discharged into the throat of the nozzle. Furthermore in this instance the loading operation may be effected by simply removing the nozzle 10, whereby the cartridge can readily be inserted through the discharge end of the cylinder in the position shown, and when so inserted its upper end will be pierced by the notched piston-rod.

Figs. 4 and 5 illustrate still another form of clutch mechanism, whereby the piston-head is locked into engagement with the piston-rod. In the latter form of my invention I provide a hollow piston-head 11 having an apertured bottom 11' and an inwardly flanged top 11". Prior to forming the inwardly turned flange 11" a pair of conical semi-circular clutch-members 12 are fitted against the bottom of the piston-head as shown, the said clutch-members being centrally cut away to form a rod aperture. These two clutch members are held in position by a coiled spring 14 which is fitted thereover and adapted to exert pressure upon said clutch members through engagement with the flange 11' as shown, the said spring being under constant pressure. By this arrangement of clutch mechanism it is apparent that a smooth surface piston-rod may be utilized, which rod is engaged by the clutch-members, when downward pressure is exerted thereupon, to effect a feed movement and when the rod is retracted the coiled spring 14 will permit the clutch-members to lift, whereby the piston-rod is free to move outwardly in a manner previously mentioned in connection with the description of the other forms of my invention.

While I have shown several forms of the invention illustrating variations in the details of construction, it is apparent that I may, in some instances, vary such details within the knowledge of the skilled mechanic without departing from the spirit of my invention, the essential elements of which embody means whereby the piston-rod may be retracted to gage a predetermined discharge of grease, the piston-rod being in clutching engagement with a follower or piston-head, whereby said follower or piston-head is caused to travel downwardly, coincident to a downward movement of the rod, to effect an intermittent feeding operation.

Referring to Fig. 7 of the drawings the cap 4 has secured thereto a bracket 15 into which is fulcrumed a pair of bell-crank levers 16, the short arms of which engage a grooved collar 17 that is carried by the piston-rod 7'. The long arms of the bell-crank levers 16 are normally spread apart by a bow-spring 18, their spread being limited through engagement of the end of the piston-rod with an ear 19 that constitutes part of the bracket 15. By this arrangement it is apparent that great power may be applied to the piston-rod, whereby the heavy grease is ejected, the operation of feeding being effected by a one hand movement which directs the device and also manipulates the discharge.

I claim:

In a cylindrical nozzled grease-gun having a reciprocative piston-rod therein; the combination of a follower-piston in clutched connection with the rod, with an original container for grease comprising a jacket of textile material normally closed at its ends and adapted to fit within the cylinder between the piston-head and nozzle thereof, the lower end of the jacket being opened to effect communication with said nozzle and the upper end being pierced by the piston-rod and in nested engagement with the piston-head.

In testimony that I claim the foregoing I have hereunto set my hand at Milwaukee in the county of Milwaukee and State of Wisconsin in the presence of two witnesses.

GEORGE E. WEBB.

Witnesses:
N. E. OLIPHANT,
M. E. DOWNEY.